3,398,149
PROCESS FOR PREPARING ADENINE
Katsura Morita, Ikeda, Osaka, Mighihiko Oghiai, Suita, Osaka, and Ryuji Marumoto, Monoo, Osaka, Japan, assignors to Takeda Chemical Industries, Ltd., Osaka, Japan
No Drawing. Filed Nov. 10, 1966, Ser. No. 593,296
Claims priority, application Japan, Nov. 12, 1965, 40/69,640
10 Claims. (Cl. 260—252)

ABSTRACT OF THE DISCLOSURE

Adenine is prepared by heating formamide with phosphorus trichloride, phosphorus oxychloride, phosphorus pentoxide, polyphosphoric acid, pyrophosphoric acid, tetrachloropyrophosphoric acid, thionyl chloride, sulfuryl chloride, chlorosulfonic acid or tosyl chloride at 70° C. to 200° C. in a sealed vessel.

---

This invention relates to a novel and improved method for producing adenine.

Adenine is an important base constituent of nucleic acid which has a wide distribution throughout animal and plant cells. Also, adenine is one of the important constituents taking part in the phosphorylation which takes place in living cells. Further, it is a constituent of various coenzymes, for example, di- or tri-phosphopyridine nucleotide and coenzyme A.

Some adenine derivatives are also included among the antibiotics (e.g., cordycepin and puromycin), and others among cytokinetic substances for plant cells (e.g. kinetin) and so on. Thus, adenine plays a vital part in compounds which are closely related to biochemical reactions. Further, adenine is regarded as one of the important intermediates for the synthesis of 5'-nucleotides used as flavor enhancers.

Heretofore, adenine has been synthesized from pyrimidine derivatives obtained by the reaction between malononitrile and thiourea, or by the reaction between malonic diamide and formamide, or by the reaction between formamidine and phenylazomalononitrile, or from 6-aminopurines having a halogen atom or mercapto group on the purine nucleus, or from imidazole derivatives (e.g. 4-amino-5-imidazolcarboxyamide). It has also been synthesized by various modifications of the above-mentioned methods.

However, these methods are not practical for the industrial production of adenine owing to various drawbacks, namely, first, the starting materials are expensive; second, the processes involve many and complicated steps; third, the yield of adenine is not high.

It has been reported that adenine was obtainable, though in very low yield, from hydrogen cyanide in the presence of ammonia. Recently, it has further been reported that adenine could be obtained in improved yields from hydrogen cyanide in the presence of ammonia under pressure.

However, these methods also have some drawbacks: namely, first, hydrogen cyanide or a salt thereof, which is fatally poisonous, has to be employed; second, the product is inevitably colored; third, insoluble by-products are unavoidable; and consequently, the yield of adenine becomes very low and the purification of the obtained adenine is very difficult.

A principal object of this invention is to obviate the defects inherent in the prior art methods and to provide a novel process for producing adenine by a single step and in good yield.

The aforesaid object is realized by subjecting formamide to the action of one of the oxyacids of phosphorus or of sulfur or the halides thereof which comprise phosphorus trichloride, phosphorus pentachloride, phosphorus oxychloride, phosphorus pentoxide, polyphosphoric acid, pyrophosphoric acid, thionyl chloride, sulfuryl chloride, chlorosulfonic acid, tosyl chloride, etc. While the objective reaction

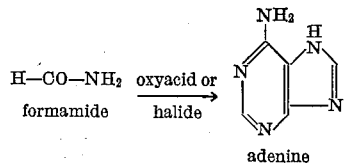

may go to completion in general when both starting materials are used in the molar ratio of 1:1, one of the starting materials may be employed in an excess amount if necessary, i.e., the molar ratio of oxyacid (or halide) to formamide may range e.g., from 1:5 to 2:1.

The reaction of the present invention is carried out under heating (from about 70° C. to about 200° C., preferably about 120° C. to about 150° C.) in a sealed vessel. If necessary, an organic solvent may be used to make the reaction proceed more smoothly. Such organic solvent is one which is inert under the reaction conditions, i.e. does not react with the formamide, the oxyacid or the halide thereof, or with the resultant adenine. Such organic solvent may be ethyl ether, tetrahydrofuran, dioxane, chloroform, dichloroethane, ethyl acetate, benzene, toluene, etc.

Adenine thus obtained can be separated from the reaction mixture in simple and per se known manner, e.g. by concentration of the reaction system, filtration and recrystallization. If necessary, purification processes using ion-exchange resins, adsorbents or the like may concomitantly be employed for isolating produced adenine.

In the method of this invention, adenine is produced by a single step reaction and the yield thereof is very good. Moreover, in the method of this invention, by-products which render the separation and purification of adenine difficult, are largely suppressed.

The following examples set forth presently preferred illustrative, but not limitative embodiments of the invention. In these examples, the relationship of parts by weight to parts by volume is the same as that of grams to milliliters.

Example 1

A mixture of 45 parts by volume of formamide and 150 parts by volume of phosphorus oxychloride is heated at 120° C. for 5 hours. After cooling, the reaction mixture is treated with 1000 parts by volume of hot water. The aqueous solution of adenine thus obtained is allowed to pass through a column packed with activated charcoal, and adenine adsorbed on the charcoal is eluted with aqueous ammonia. From the concentrated eluate, adenine is obtained as white powder. Yield 14 parts by weight.

Paper partition chromatography confirms the identity of the obtained product with authentic adenine.

Example 2

To a solution of 45 parts by volume of formamide in 200 parts by volume of dioxane is added 190 parts by weight of tosyl chloride. The mixture is heated at 130° C. for 10 hours. The reaction mixture is treated in similar manner to that in Example 1 to give adenine as white powder. Yield 9 parts by weight.

Example 3

45 parts by volume of formamide and 200 parts by weight of phosphorus pentachloride are added to 200 parts by volume of tetrahydrofuran. Then the mixture is heated at 120° C. for 6 hours. The reaction mixture is treated in similar manner to that in Example 1 to give adenine as white powder. Yield 9 parts by weight.

Example 4

A mixture of 45 parts by volume of formamide and 140 parts by volume of phosphorus trichloride is heated at 130° C. for 7 hours. In similar manner to that in Example 1, the reaction mixture is treated to give adenine as white powder. Yield 7 parts by weight.

Example 5

45 parts by volume of formamide and 63 parts by weight of tetrachloropyrophosphate are dissolved in 200 parts by volume of chloroform and then the mixture is heated at 110° C. for 10 hours. In similar manner to that in Example 1, the reaction mixture is treated to give adenine as white powder. Yield 9 parts by weight.

Example 6

A mixture of 45 parts by volume of formamide and 50 parts by weight of phosphorus pentoxide is heated at 120° C. for 5 hours. In similar manner to that in Example 1, the reaction mixture is treated to give adenine as white powder. Yield 8 parts by weight.

Example 7

A mixture of 45 parts by volume of formamide and 100 parts by weight of polyphosphoric acid is heated at 80° C. for 24 hours. In similar manner to that in Example 1, the reaction mixture is treated to give adenine as white powder. Yield 7 parts by weight.

Example 8

A mixture of 45 parts by volume of formamide and 120 parts by volume of thionyl chloride is heated at 125° C. for 6 hours. In similar manner to that in Example 1, the reaction mixture is treated to give adenine as white powder. Yield 7 parts by weight.

Example 9

A mixture of 45 parts by volume of formamide and 120 parts by volume of chlorosulfonic acid is heated at 100° C. for 10 hours. In similar manner to that in Example 1, the reaction mixture is treated to give adenine as white powder. Yield 8 parts by weight.

What is claimed is:

1. A process for preparing adenine which comprises heating formamide with a member selected from the group consisting of phosphorus trichloride, phosphorus oxychloride, phosphorus pentoxide, polyphosphoric acid, pyrophosphoric acid, tetrachloropyrophosphoric acid, thionyl chloride, sulfuryl chloride, chlorosulfonic acid and tosyl chloride at a temperature within the range from about 70° C. to about 200° C. in a sealed vessel.
2. A process according to claim 1 wherein the said member is polyphosphoric acid.
3. A process according to claim 1 wherein the said member is phosphorus pentoxide.
4. A process according to claim 1 wherein the said member is phosphorus oxychloride.
5. A process according to claim 1 wherein the said member is tosyl chloride.
6. A process according to claim 1 wherein the said member is phosphorus pentachloride.
7. A process according to claim 1 wherein the said member is phosphorus trichloride.
8. A process according to claim 1 wherein the said member is tetra-chloro pyrophosphate.
9. A process according to claim 1 wherein the said member is thionyl chloride.
10. A process according to claim 1 wherein the said member is chlorosulfonic acid.

References Cited

Falco et al.: Studies on Condensed Pyrimidine Systems, X, some 1,4-oxazala(5,4–d)pyrimidines; Journal of American Chemical Society, 74, 1952 (pp. 4897–4902 relied on).

NICHOLAS S. RIZZO, *Primary Examiner.*

A. M. TIGHE, *Assistant Examiner.*